United States Patent [19]

Harrow et al.

[11] 4,268,196
[45] May 19, 1981

[54] WORK-PIECE SUPPORTED TOOL APPARATUS PARTICULARLY ADAPTED FOR USE WITH LARGE STRUCTURAL MEMBERS

[75] Inventors: James E. Harrow, Overland Park; Robert T. Kenney, II, Olathe, both of Kans.

[73] Assignee: Kansas City Structural Steel Co., Kansas City, Kans.

[21] Appl. No.: 63,522

[22] Filed: Aug. 3, 1979

[51] Int. Cl.³ .................... B23B 39/22; B23B 41/00
[52] U.S. Cl. ................................. 408/39; 51/178; 51/241 S; 408/41; 408/53; 408/78; 408/103; 409/180
[58] Field of Search ............ 408/1, 3, 10, 16, 35, 408/37, 38, 39, 41, 53, 77, 78, 91, 115, 103, 109; 409/178, 179, 180; 51/178, 241 S

[56] References Cited
U.S. PATENT DOCUMENTS

| | | | |
|---|---|---|---|
| 2,546,957 | 3/1951 | Ray | 408/77 X |
| 2,630,026 | 3/1953 | Monson | 408/35 X |
| 2,871,730 | 2/1959 | Gremp | 408/77 |
| 2,988,934 | 6/1961 | Shlager | 408/16 |
| 4,179,230 | 12/1979 | Kitagawa | 408/39 |

Primary Examiner—Z. R. Bilinsky
Attorney, Agent, or Firm—Schmidt, Johnson, Hovey & Williams

[57] ABSTRACT

Apparatus is provided for carrying, positioning and operating relatively unwieldy machine tools, such as heavy multiple-head drilling assemblies, upon massive flanged work-pieces, such as structural members for bridges, in order to more efficiently perform required operations upon the work-pieces, such as the pre-drilling of girders and their associated splice plates in a fabrication yard prior to field erection of the structure into which they will be assembled. The tool-carrying apparatus utilizes the work-piece itself as a supporting track and is provided with self-contained mechanism for propelling the apparatus to successively desired positions along the work-piece, with self-contained mechanism for releasably securing the apparatus in a desired position upon the work-piece, with self-contained mechanism for adjusting the tool vertically or/and tiltably relative to the work-piece, and with self-contained mechanism for shifting the tool toward and away from the work-piece, as well as self-contained mechanism for operating the tool itself.

9 Claims, 6 Drawing Figures

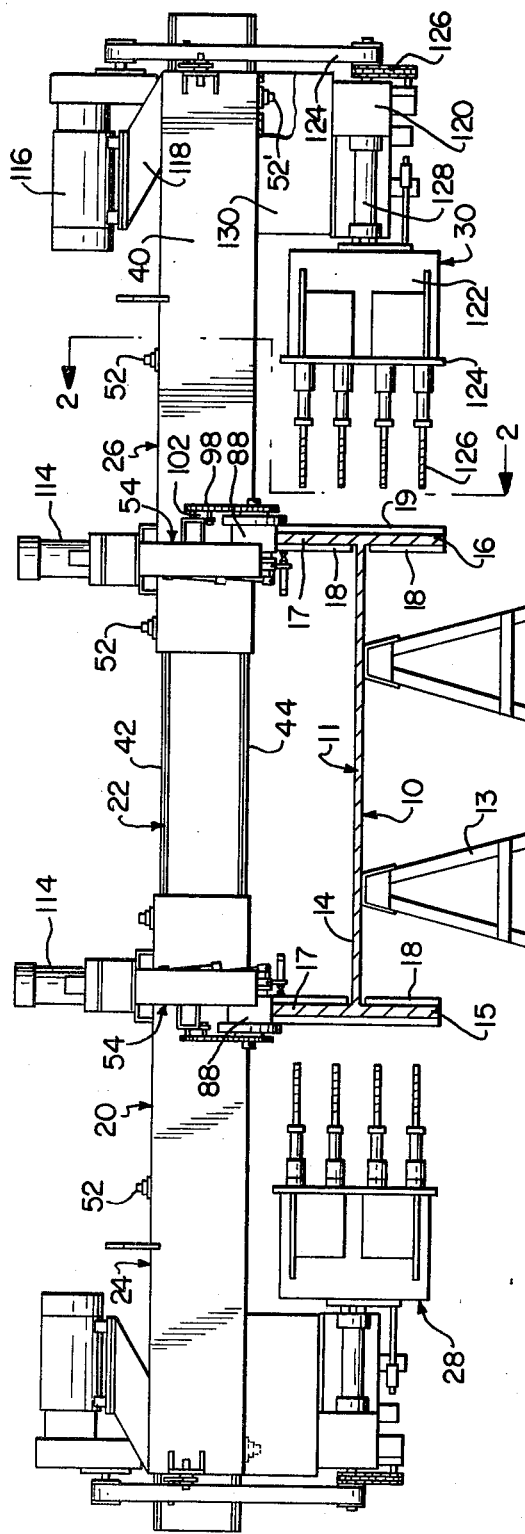
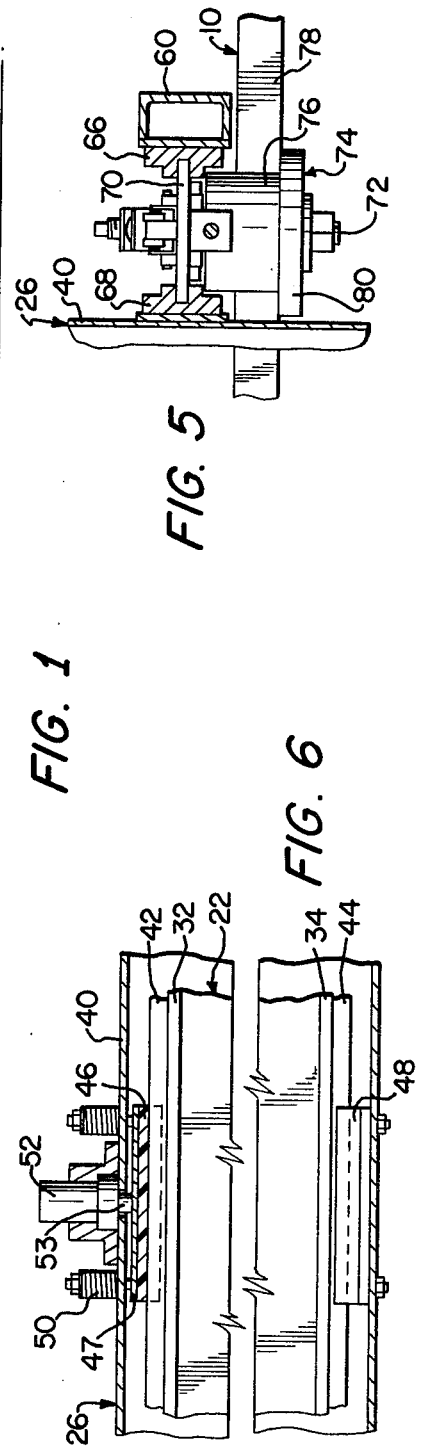
FIG. 1
FIG. 5
FIG. 6

WORK-PIECE SUPPORTED TOOL APPARATUS PARTICULARLY ADAPTED FOR USE WITH LARGE STRUCTURAL MEMBERS

BACKGROUND OF THE INVENTION

Field of the Invention

This invention relates to the manufacture of large structural members such as steel girders for use in bridges or other structures and, in its preferred embodiment, is especially adapted for use in performing certain drilling operations required in the manufacture of such structural members.

The class of structural members with which the apparatus of the invention is primarily intended for employment are typically fabricated of steel in a generally I-shaped cross-sectional configuration involving a pair of side plates centrally inter-connected by a transverse web (and, perhaps, additional bracing elements), presenting at each side of the members what are commonly referred to in the trade as "flanges" extending in opposite directions from the central web. Such members may typically have lengths in the range of about 50 to 100 feet, widths in the range of about 4 to 12 feet, side plate widths in the range of about 10 to 30 inches and flange thicknesses in about the range of ¾ to 2½ inches. Such members are obviously of corresponding weight and difficulty as to handling.

In the construction of bridges or other structures in which such members are used, it is typically required that a plurality of such members will be joined together in end-to-end abutting relationship to provide a single, relatively rigid, elongate structural assembly of the final structure being constructed. Such joinder between abutting end portions of adjacent members in such an assembly is normally accomplished by providing steel plates of suitable dimensions, up to about 3 feet by 1½ feet being typical, in overlapping relationship with the end portions of both of the adjacent structural members, on both the inner and outer surfaces of the flange thereof, and then securing such splice plates to the flanges of the members by a plurality of relatively large bolts passing through the outer splice plate, the flange of the structural member and the inner splice plate with a securing nut then emplaced upon each bolt. The splice plates will typically have a thickness within the range of about ⅜ths to 1½ inches, so that the overall thickness of the outer splice plate, the inner splice plate and the flange of the structural member sandwiched therebetween will typically aggregate to several inches. The diameter of the bolts employed in thus joining girders or comparable structural members will typically be in the range of about ¾ inches to 1 inch. In order for the bolts and various portions of the splice plates to appropriately share the shear and other forces involved in accomplishing a rigid interconnection between the longitudinally abutting structural members, it is necessary that the bolts be received within holes in the splice plates and the flanges with relatively limited clearance tolerances.

It is impractical, of course, to attempt to drill the holes required for accommodating the fastening bolts during actual assembly of the structural members into the bridge or other final structure being constructed, since such members will then be typically at an elevated location substantially above water or ground level requiring that operations to be performed by the assembly workmen must be minimized, and it will also be appreciated that the equipment required for drilling in the type of work-pieces involved is necessarily relatively bulky and heavy to an extent rendering it virtually impossible for workmen to properly handle such equipment in such an environment. Accordingly, it is virtually essential and customary that the sets of holes required in both the structural members and the splice plates will all be pre-drilled, so that the splice plates and bolts may simply be assembled with the structural members during final assembly of the bridge or other structure. Since a typical bridge, for example, may require the employment of several thousand bolts for joining structural members together with splice plates, it will be apparent that a very substantial number of pre-drilling operations will be required. Moreover, unless the individual holes and flanges of each pair of abutting structural members and the holes in the splice plates to be associated therewith are positioned in near perfect alignment with each other, it will be manifest that substantial difficulties and delays will be encountered during final assembly of the overall structure by the inability of assembly workmen to install the required bolts without the reworking or substitution of parts.

Accordingly, the customary practice is that the structural members to be thus interconnected during assembly of the final structure will first be laid out generally horizontally, but in their desired final relative juxtapositions, upon "horses" or other suitable supports in a fabrication yard in an undrilled condition, the splice plates in undrilled contion to be associated with such structural members will also be placed and clamped into their desired final relationships to the latter, and the required holes will then be drilled through the splice plates and flanges of the structural members to be joined in one drilling operation, thereby assuring alignment of the holes through all three of such elements for each bolt to be inserted therethrough. The ends of the particular structural members to be joined in the assembled final structure and the particular splice plates to be employed in accomplishing that joinder will normally be appropriately marked to facilitate their being properly associated with each other during final assembly of the structure.

DESCRIPTION OF THE PRIOR ART

As will be appreciated from the foregoing, the weight and bulk of both the structural members and the type of equipment needed for forming aligned holes therein are such that this aspect of the fabrication of structural members has always been a difficult, tedious, time consuming and expensive part of the overall manufacturing operation. Aside from the problems created by the mentioned weight and bulk factors, there is an additional problem presented by the fact that efforts to drill through structural steel parts of the thicknesses involved tend to produce objectionable vibrations such that the expensive type of drill bits that must be used are easily broken or subjected to premature wear, in addition to the difficulties obviously presented for the workmen attempting to perform the hole forming operation.

In general, two techniques have previously been employed and proved operable. In the first of these, the splice plates and flanges would be predrilled or punched with undersize holes smaller than the ultimately required diameter to provide a guide, then the splice plates would be clamped to the flanges in the desired juxtaposition, and then the undersize guide holes would be enlarged through the use of a reamer passed through the clamped plates and flange at each desired hole location to provide proper alignment and sizing of each hole through the mentioned three elements. The second common approach has been to pre-assemble the structural members to be joined, clamp their associated splicing plates in the desired positions and then drill each of the desired holes therethrough successively (but in a single operation insofar as drilling each hole through all three of the mentioned elements at the same time is concerned).

With either of the mentioned techniques or variations thereof heretofore employed, however, the essential problem has remained with respect to how best to support the juxtaposed structural members and their associated splicing plates clamped thereto relative to the means of support employed for the drilling or reaming tool, particularly with respect to the matter of providing for relative movement between the tool and the work-piece so that holes could be successively formed at the various and numerous locations at which they are required. Again, there have been two basic approaches to the latter problem of which we are aware. The first technique has been to dispose and support the structural members in proper juxtaposition on the ground by means of underlying fixtures referred to in the trade as "horses", with the splicing plates being clamped thereto, while movably supporting the drilling or reaming tool from a crane, gantry or the like in such manner that the tool to be moved to successive hole locations while the structural members and associated splice plates clamped thereto remain stationary. The second technique has involved the provision of special equipment for shiftably supporting the structural members so that they can be shifted relative to a stationary tool to permit successive drilling or reaming at each required hole location in the workpiece; because of the bulk and weight of the workpiece, such equipment for shiftably supporting the same has itself necessarily been bulky and expensive in order to provide the required strength and has typically involved a large platform having a floor surface comprised of heavy, parallel steel rollers for supporting the work-piece in a manner such that, albeit with considerable effort, the work-piece can be moved upon the platform to accomplish the positioning of the work-piece relative to the stationary tool for performing the hole forming operations at each successive hole position. Both of such types of prior equipment available for accomplishing the necessary support and relative repositioning functions have, however, been subject to a number of disadvantages and limitations, the aggregate effect of which has been to keep the economic cost of drilling the required holes objectionably high, in terms of both the time and monetary expense consumed in performing the operation itself, quite aside from the substantial initial investment involved in providing either special gantry or other arrangements for movably supporting the type of tool required or for movably supporting the kind of work-piece under consideration. Our experience with utilizing or observing previously available types of equipment arrangements and techniques for accomplishing the required hole drilling operations in structural members such as commonly employed for bridge girders or the like is that about the best that can be expected is to average about 8 minutes per hole. We have found that, with the apparatus contemplated by this invention, we are able to reduce such time to an average of about ½ minute per hole or less.

SUMMARY OF THE INVENTION

The improved apparatus provided by this invention for performing the type of drilling operation referred to above, or comparable operations in which a relatively unwieldable tool must be successively applied to a massive work-piece at numerous different locations on the latter, fundamentally involves the novel approach in this field of utilizing the work-piece itself to provide essentially a double-rail track for shiftably supporting a wheeled tool carrier assembly which rides atop the work-piece, carries appropriate tool means depending from the carriage at the side of the work-piece, and includes appropriate means for adjusting the positioning of the tool means relative to the work-piece both longitudinally and in one transverse direction of the work-piece and for feeding and withdrawing the tool in the other transverse direction relative to the work-piece. When embodied in apparatus for performing the above-described drilling function upon large structural members, our invention provides simultaneously operable drilling tools at each side of the work-piece juxtaposed with the corresponding side plate of the latter, which drilling assemblies are independently shiftable longitudinally of a common support beam extending transversely above the work-piece, with each drilling assembly being provided with wheel means by which the entire apparatus is supported upon the flanges of the work-piece for movement longitudinally of the latter. Further important features of our apparatus include means for adjusting the vertical positioning of the wheels relative to the drilling assemblies to provide for vertical or tilting adjustment of the drilling assemblies relative to the work-piece, means for driving such wheels to shift the apparatus between successive positions longitudinally of the work-piece, means for clamping the apparatus to the work-piece when the apparatus has been appropriately positioned for a given drilling operation, and means for clamping the drilling assemblies to their common support beam to essentially render our apparatus and the work-piece into a condition of unitary rigidity minimizing the effects of vibration and preventing relative shifting movement between the apparatus and the work-piece which can result in breakage or undue wear of drill bits even from very limited relative shifting movement. Other important, though more detailed, aspects of the construction of our improved apparatus and its use will, of course, be brought out or become apparent to those skilled in the art from the drawings and the detailed description of our currently preferred embodiment of our improved apparatus which follows hereinafter.

BRIEF DESCRIPTION OF THE DRAWINGS

In the accompanying drawings:

FIG. 1 is a side elevational view of the currently preferred embodiment of our apparatus employing opposed, multiple head drilling tools, showing such apparatus supported, as contemplated by our invention, directly upon a typical work-piece illustrated in transverse cross-section;

FIG. 5 is a fragmentary, cross-sectional view taken on line 5—5 of FIG. 2; and

FIG. 6 is a fragmentary, cross-sectional view taken on irregular line 6—6 of FIG. 2.

DESCRIPTION OF THE PREFERRED EMBODIMENT

Figure 2:
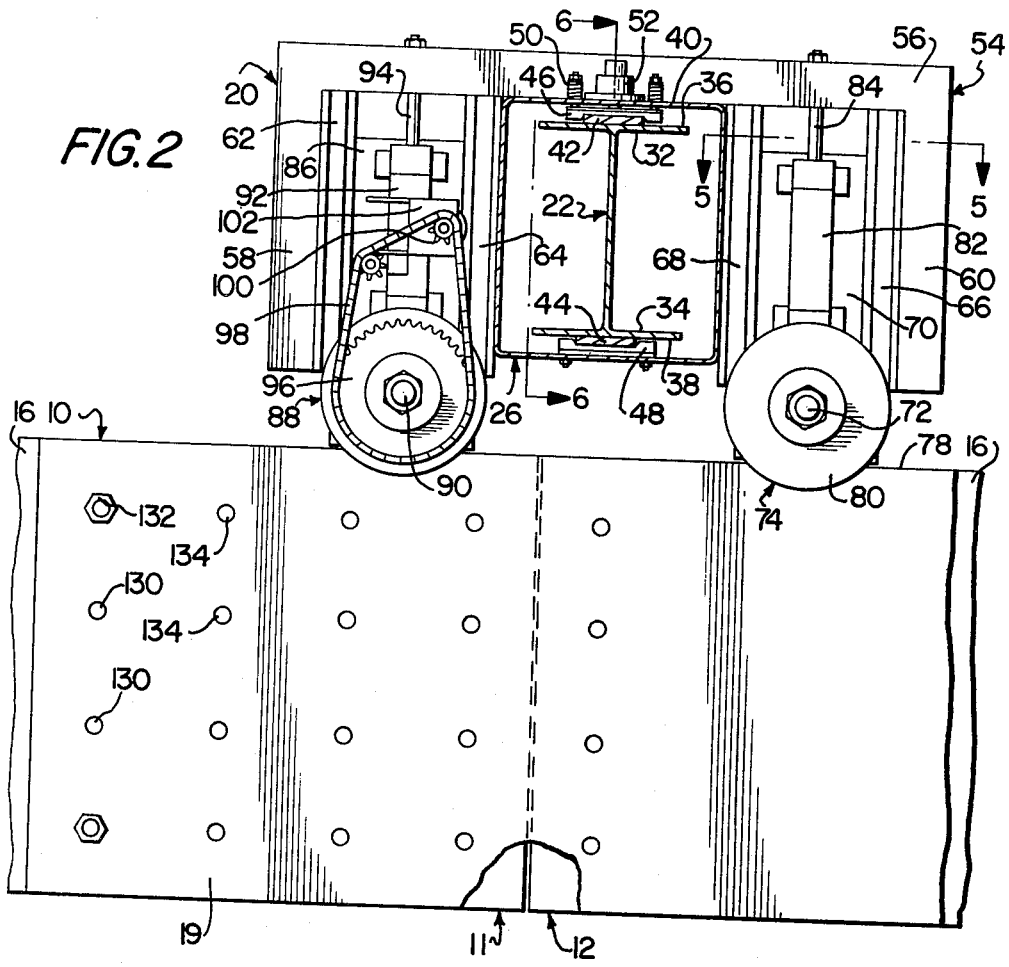
FIG. 2 is a cross-sectional view of such apparatus taken on irregular line 2—2 of FIG. 1, which shows portions of the rightmost tool carrier from FIG. 1 and also shows a fragmentary portion of the work-piece in side elevation.

Referring initially to FIGS. 1 and 2, the currently preferred embodiment of apparatus illustrating the principles of our invention as applied to the drilling of splice plate holes for structural members is generally designated 20 and is shown in a typical disposition upon a work-piece assembly generally designated 10.

The work-piece 10 chosen for illustration includes a pair of elongate, steel girders or the like 11 and 12 supported in end-to-end relationship as by suitable fixtures 13, commonly called "horses". The girders 11 and 12 are generally I-shaped in transverse cross-section and each include a transverse web portion 14 and a pair of spaced, typically parallel, side plates 15 and 16. The upper, up-standing portions 17 of the side plates 15 and 16, commonly referred to as the "flanges" of the work-piece 10, present along their upper edges a pair of spaced, track surfaces upon which the apparatus 20 is supported, as hereinafter further described. The work-piece 10 in the application chosen for illustration also includes inner splice plates 18 and outer splice plates 19, of the required number and configuration for the particular structural assembly to be ultimately produced, which it will be understood are conventionally clamped in their desired ultimate positions upon the inner and outer surfaces of the side plates 15 and 16 of the girders 11 and 12 by any suitable clamping means (not shown), but which are so emplaced in initially undrilled condition.

The apparatus 20 broadly includes an elongate support beam 22 extending transversely to the work-piece 10 at a level above the latter; a pair of wheeled, tool carrier assemblies 24 and 26 shiftably mounted upon the beam 22 and shiftably supported upon the work-piece 10 as hereinafter further described; and a pair of multiple head drilling tools 28 and 30 respectively mounted upon the carrier assemblies 24 and 26. Further important sub-assemblies, associated mechanisms and significant components will be identified hereinafter.

The beam 22 is common to the carrier assemblies 24 and 26 and should be of sufficient length to extend through both of the latter when they are disposed for support upon work-pieces 10 of widths within the normal range to be operated upon by the apparatus 20. The beam 22 could be of various constructions presenting the upper and lower, longitudinal, support or load bearing surfaces hereinafter identified, but, for convenience and economy of fabrication, is preferably provided merely by a steel "I-beam" or similar structural members of generally I-shaped transverse cross-section and appropriate size. The beam 22 includes longitudinal top and bottom plate portions 32 and 34 respectively presenting substantially parallel top and bottom surfaces 36 and 38 thereon. By virtue of the nature of the beam 22, it would be quite feasible, if desired, to have available alternate beams 22 of differing lengths, which could be selectively employed to better accommodate to possible use situations involving an unusually wide range of widths of work-pieces 10 to be operated upon.

Aside from the reversed orientations thereof apparent from FIG. 1, the carrier assemblies 24 and 26 are of virtually identical construction, and it should suffice to describe particular sub-assemblies with reference to either of them, with the understanding that the other will be similarly constructed. The tool carrier 26 (or 24) has as its basic structural or frame element an elongate, open-ended, box or tube 40, which may be readily fabricated of steel of suitable guage and strength. As best shown in FIG. 2, the tube 40 is preferably generally rectangular in transverse cross-section and internally dimensioned to freely fit over a corresponding length of the beam 22, with respect to which the tube 40 is longitudinally shiftable. As best shown in FIGS. 2 and 6, the tube 40 is shiftably supported and guided for longitudinal movement along the beam 22 by means of elongated, upper and lower, guide bars 42 and 44 respectively secured to and extending longitudinally along the upper and lower surfaces 36 and 38 respectively of the beam 22, and by cooperating pairs of upper and lower, guide channel pads 46 and 48 respectively spaced longitudinally along the tube 40 and respectively mounted at the top and bottom of the interior of the tube 40. One of each pair of guide channel pads 46 and 48 is rigidly secured to the corresponding wall portion of the tube 40 in any suitable manner such as bolting, while the other of each pair of pads 46 and 48 is floatingly mounted on the opposite wall portion of the tube 40 by inwardly directed, spring-biased, pin mechanisms as at 50 and is provided with a fluid cylinder assembly 52 coupled therewith for urging such pad more forcefully inwardly to effect a clamping action upon the portion of the cooperating guide bar 42 or 44 engaged thereby when the cylinder assembly 52 is activated.

It will be observed that, in FIG. 2, the pad 48 embracing the lower bar 44 is rigidly mounted to the bottom portion of the tube 40, while the pad 46 embracing the upper bar 42 is floatingly mounted and adapted to be forcefully shifted inwardly into clamping engagement with the bar 42 by a cylinder assembly 52 mounted atop the tube 40, and the same construction should be understood as applicable for those pad pairs 46–48 and their associated cylinder assemblies 52 which are disposed within the longitudinally inner (or leftmost in FIG. 1) half of the tube 40 of the carrier assembly 26; however, it will be further noted in FIG. 1 that the cylinder assembly 52 illustrated as disposed in the longitudinally outer (or right) half of the tube 40 of the carrier assembly 26 is mounted at the bottom of such tube 40. The reason for this is that the weight of the tools 28 and 30 and other parts carried by the longitudinally outer half of the tube 40 is sufficient that the longitudinally outer (rightmost) end of the tube 40 of the carrier assembly 26 is more heavily top loaded than the inner (leftmost) end thereof, and, in fact, the loading on the bottom of such inner portion tends to be greater than on the top thereof. Since it is preferred to locate the clamping cylinder assemblies 52 on the less heavily loaded side (top or bottom) of the tube 40, it will be understood that the fixed and floating mountings illustrated in FIG. 2 for the inwardly disposed pads 48 and 46 respectively are interchanged for the more outwardly disposed pair of pads 46 and 48, so that the outer clamping cylinder assembly 52' is located on the bottom of the tube 40 and effects clamping by engagement with the lower guide bar 44 (rather than with the upper guide bar 42 as for the pad pair 46 and 48 shown in FIG. 2).

In our currently preferred construction, the guide bars 42 and 44 are in the nature of metal strips welded to the surfaces 36 and 38 respectively of the beam 22, and the channel pads 46 and 48 are formed of low friction material such as nylon. The pads 46 desirably are provided with a metal backing plate 47 for engagement by the piston 53 of the associated cylinder assembly 52. With this arrangement, it has been found that the carrier assemblies 24 and 26 can be manually shifted to their desired positions longitudinally of the beam 22 without substantial difficulty and then quite firmly clamped in such positions by actuation of the fluid cylinder assemblies 52 (including 52'). It is contemplated, of course, that powered drives such, for example, as fluid motor rotated pinions mounted on the tubes 40 and meshing with suitable racks on the beam 22, could be provided for use in shifting the carrier assemblies 24 and 26 longitudinally of the beam 22, but it does not appear that this is really necessary in apparatuses 10 of size for operating upon work-pieces of the kinds most commonly encountered.

Figure 4:
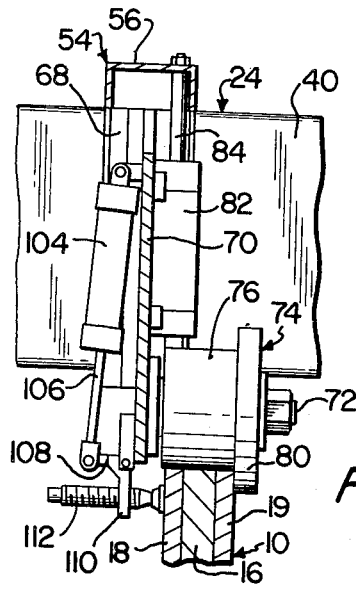
FIG. 4 is a fragmentary, cross-sectional view taken on line 4—4 of FIG. 3.
Figure 3:
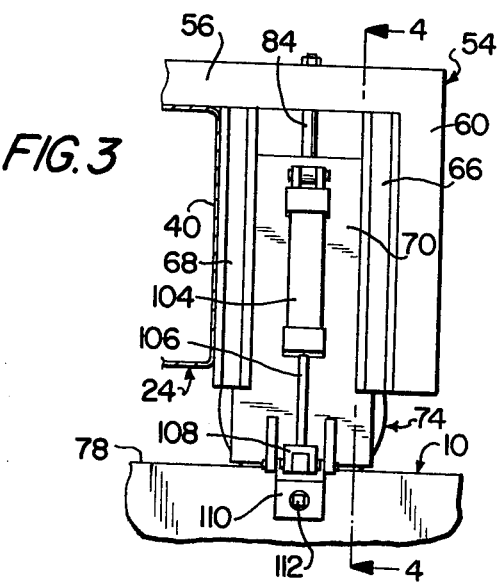
FIG. 3 is a fragmentary, elevational view showing one of the clamping mechanisms associated with the other (leftmost in FIG. 1) tool carrier assembly of such apparatus, looking longitudinally of the apparatus alongside such tool carrier assembly from adjacent the inner extremity of the latter.

Adjacent the longitudinally inner end of the tube 40 of each of the carrier assemblies 24 and 26 is provided frame structure 54 rigidly secured to the tube 40, as by welding. The frame structure 54 straddles the tube 40 and includes a transversely crossing top part 56, depending legs 58 and 60 on opposite sides of the tube 40 and spaced outwardly from the latter, spaced vertical guide channel members 62 and 64 respectively adjacent the leg 58 and the proximate side of the tube 40, and spaced vertical guide channel members 66 and 68 respectively adjacent the leg 60 and the proximate side of the tube 40, as best shown in FIGS. 2 and 5 for the carrier 26 (the nature of the reverse orientation for the carrier 24 being partially indicated in FIGS. 3 and 4).

A plate 70 is slidably received for relative vertical reciprocation in the channel member 66 and 68 of the frame structure 54 of each of the tool carrier assemblies 24 (see FIGS. 3 and 4) and 26 (see FIGS. 2 and 5). The plate 70 carries on one side thereof a pivot shaft 72 for rotatably mounting a wheel 74 having a main circumferential portion 76 adapted to ride upon the upper edge 78 of the work-piece 10 and an out-turned flange portion 80 for assisting to guide the wheel 74 along the surface 78 of work-piece 10 and for providing one "jaw" of a clamping mechanism hereinafter described. Secured to the same side of the plate 70 is a fluid cylinder assembly 82 having a piston rod 84 connected to the cross portion 56 of the frame structure 54. As will be apparent, with the wheel 74 supported upon top surface 78 of work-piece 10, operation of the cylinder assembly 82 to extend its piston rod 84 will raise the corresponding side of the frame structure 54 and visa versa, with such movement being guided by the sliding relationship between the channel members 66 and 68 and the wheel carrying plate 70.

Similarly, a plate 86 is slidably received for relative vertical reciprocation in the channel members 62 and 64 of the frame structure 54 of each of the tool carrier assemblies 24 and 26. The plate 86 also carries a wheel 88 rotatable upon a shaft 90 and a fluid cylinder assembly 92 having its piston rod 94 connected to the cross piece 56 of the frame structure 54, all of which function in the same manner as previously described for the plate 70, wheel 74 and cylinder assembly 82 insofar as supporting and raising and lowering the corresponding side of the frame structure 54 is concerned. The wheel 88, as best shown in FIGS. 1 and 2, however, is additionally provided on the outer face thereof with a sprocket 96 coupled by a chain 98 with a drive pinion 100 on a reversible, rotary, fluid motor 102 mounted on the plate 86 for powering the wheels 88 on both carrier assemblies 24 and 26 to move the apparatus 20 longitudinally of the work-piece 10. As indicated in FIG. 1, it is preferred that both of the driven wheels 88 be on the same side of the beam 22, and the carrier assemblies 24 and 26 are so arranged.

At this juncture, it is appropriate to observe that the ability to independently raise or lower either side of the frame structure 54 relative to its wheel 74 or 88 in each of the carrier assemblies 24 and 26 provides great flexibility and convenience in positioning each carrier assembly 24 and 26 and the tools 28 and 30 respectively carried thereby, both vertically with respect to work-piece 10 as both wheels 74 and 88 of a given carrier 24 or 26 are "raised" or "lowered", and in a rotational sense with respect to the work-piece 10 as one of the wheels 74 or 88 of a given carrier 24 or 26 is "raised" or "lowered" relative to the other. The latter adjustment is particularly useful where the surface 78 of the work-piece 10 may not be entirely flat. Similarly, the wheeled mounting of the carriers 24 and 26 directly upon the work-piece 10 provides great convenience in properly positioning the tools 28 and 30 longitudinally of the work-piece 10.

On the opposite side of each of the plates 70 (or 86) from the wheel 74 (or 88) and cylinder assembly 82 (or 92) is a pivotally supported fluid cylinder assembly 104 having its piston rod 106 pivotally coupled with one leg 108 of a pivotally supported crank having a depending leg 110 which is topped to adjustably receive a threaded clamping element 112. When the cylinder assembly 104 is operated to extend its piston rod 106, the crank 108-110 is forcefully rotated to urge the clamping element 112 into strong engagement with the side of the work-piece 10 opposite from the flange portion 80 of the corresponding wheel 74 or 88, thereby tightly clamping the work-piece 10 therebetween. Such clamping adjacent each of the four wheels 74 and 88 manifestly maintains the apparatus 20 in a fixed longitudinal position relative to the work-piece 10 during operation of the tools 28 and 30. Less apparent, however, may be the fact that such clamping of the apparatus 20 to work-piece 10, in conjunction with the previously described clamping of the carrier assemblies 24 and 26 to the beam 22, effectively renders the entire apparatus 20 and work-piece 10 a unitary assembly during operation of the tools 28 and 30, which greatly lessens the vibrations that would otherwise occur during drilling operations; indeed, it is this ability of the apparatus 20 to drastically minimize vibrations that renders it practical to employ multiple bit drill head tools 28 and 30 for this type of application, rather than single bit heads, without the expensive bit wear and breakage problem normally occasioned by attempts to use multiple bit heads in other than fixedly mounted drilling equipment.

Each of the carrier assemblies 24 and 26 is provided with a hydraulic pump 114 having its own electric drive motor associated therewith for supplying fluid under pressure for the operation of the cylinder assemblies 82 and 104 and the fluid motor 102 associated with that carrier assembly 24 or 26. The electrically driven fluid pumps 114 may be conveniently mounted atop the crossing portion 56 of the frame structures 54.

Also provided, but not shown in the drawing, are miscellaneous conventional sub-assemblies and components, including an electric junction box, various solenoid operated valves for controlling the operation of the fluid cylinders 82 and 104, the fluid motors 102 and tools 28 and 30, and an operator control panel for each of the carrier assemblies 24 and 26, which miscellaneous sub-assemblies and components may be mounted along the top and sides of the tubes 40 of the assemblies 24 and 26 at any suitable location thereon, taking into account operator convenience and considerations of safety with respect to the disposition of the operator control panels.

Each of the tools 28 and 30 shown for illustration is a multiple bit drilling device, such as available from Rockford Drill Head, Inc. as its Model No. PQ 3250, possibly modified as to the mounting of certain components thereof. Broadly, the tools 28 and 30 each include an electrical drive motor 116, which may be mounted atop the tube 40 of the corresponding carrier assembly 24 or 26 by bracket means 118, a hydraulic pump feed 120 and a gear box 122, which are driven by the motor 116 via suitable belt or other conventional coupling means 124 and 126, a drill head 124 having a plurality of bits 126, and a fluid cylinder 128 for feeding or withdrawing the head 124 and bits 126 relative to the work-piece 10. As will be apparent to those skilled in the art, various conventional and commercially available types of muliple bit drilling devices could be employed for the tools 28 and 30 (or differing types of tools 28 and 30 may be provided for performing operations other than drilling upon the work-piece 10). With the mentioned Rockford Model No. PQ 3250 drilling devices utilized for the tools 28 and 30 in the preferred embodiment being described to illustrate the invention, however, it may be noted that the lower portions 120, 122, 124 and their associated components are available from the manufacturer of such devices as a unit, which may be conveniently mounted in depending fashion from the tubes 40 of the carrier assemblies 24 and 26 by suitable bracket means 130, as best shown in FIG. 1, and it may be also observed that the mentioned Rockford devices employed as tools 28 and 30 utilize internal mechanical couplings for rotating the bits 126 while employing fluid power from the pump 120 to control fluid cylinder 128 for feeding or withdrawal of the bits 126 relative to the work-piece 10.

In operation, still referring to the girder and splice plate drilling application chosen for illustration, the girders 11 and 12 are first arranged upon the horse 13 in the same end-to-end relationship they are to have in the ultimate structure and to which they are to be assembled. The splicing plates 18 and 19 are then appropriately disposed in their ultimately desired locations and overlapping relationship to the side plates 15 and 16 of the girders 11 and 12 and are firmly clamped in such positions by conventional clamping means (not shown). The apparatus 20 is then emplaced atop the work-piece 10 in any suitable fashion, as by means of a crane or hoist customarily available in a steel fabrication yard, with the wheels 74 and 88 associated with each of the carrier assemblies 24 and 26 disposed atop the surfaces 78 of the flanges 17 of the work-piece 10, it being noted that during such emplacement of the apparatus 20 upon the work-piece 10 the clamping cylinders 52 may be deactivated to permit the operators (of which there will normally be one for each of the carrier assemblies 24 and 26) to appropriately shift the assemblies 24 and 26 toward or away from each other for proper alignment of the wheels 74 and 88 with the track surfaces 78 of the particular work-piece 10 to be operated upon. With the apparatus 20 thus positioned and supported upon the work-piece 10, the clamping cylinders 52 may be activated to lock the carrier assemblies 24 and 26 in proper disposition relative to each other upon their common support beam 22.

The operators may then appropriately activate the reversible fluid motors 102 to drive the wheels 88 for moving the apparatus 20 longitudinally of the work-piece 10 until the bits 126 are properly disposed for drilling a first row of holes 130 through the splicing plates 18 and 19 and the side plate 15 or 16 of the work-piece 10. With the apparatus 20 thus properly positioned longitudinally of the work-piece 10, the cylinders 104 will be activated to operate the clamps 112 for locking the apparatus 20 in its selected position longitudinally of the work-piece 10. It is noted that the clamping elements 112 are threaded to permit minor manual adjustment to accommodate to work-pieces 10 having side plates 15 or 16 and splicing plates 18 and 19 of varying thickness.

With the apparatus 20 thus locked in position upon the work-piece 10 in a longitudinal sense with respect to the latter, the operators may then activate the cylinders 82 and 92 to raise and lower the carrier assemblies 24 and 26, and thereby the tools 28 and 30, with respect to the work-piece 10 so as to dispose the bits 126 for drilling the holes 130 at the desired vertical levels. At the same time, if the portions of the track surfaces 78 upon which the wheels 74 and 88 are resting should not be level so as to dispose the bits 126 for drilling the holes 130 with the desired degree of vertical orientation, or if it should be desired that the row of holes 130 be drilled along other than a vertical line, the operators may independently actuate the cylinders 82 and 92 to provide the desired degree of verticality or tilt for the row of holes 130 to be drilled.

With the multiple bits 126 thus appropriately aligned with the work-piece 10 for drilling the first row of holes 130, the operators may activate the tools 28 and 30 for rotation of the bits 126 thereof and for controlling the cylinders 128 to feed the heads 124 and bits 126 into drilling relationship with the work-piece 10. After the first row of holes 130 has been drilled, it is convenient and usually desirable to fasten the splicing plates 18 and 19 to the side plates 15 and 16 by nut and bolt means 132 passed through some of the holes 130 that have been drilled, in order to further secure the splicing plates 18 and 19 in the desired locations upon the side plates 15 and 16 of the work-piece 10.

With the first row of holes 130 thus drilled and the head 124 and bits 126 having been withdrawn to the positions indicated in FIG. 1 by operator control of the cylinders 128, the clamping cylinders 104 may be deactivated to permit movement of the apparatus 20 longitudinally of the work-piece 10, and the fluid motors 102 may be appropriately activated to move the apparatus 10 to a position for drilling the next row of holes 134. When the apparatus 20 has thus been properly repositioned longitudinally of the work-piece 10, the cylinders 104 may be actived to operate the clamps 112 for locking the apparatus 20 in its relocated position longitudinally of the work-piece 10. If necessary, the operator may then activate the cylinders 82 and 92 to properly control the height or verticality or tilt of the bits 126.

The operators may then again operate the tools 28 and 30 in the manner previously described, and the entire sequence may then be repeated as required to complete the drilling of all of the rows of holes that are desired to be formed in the work-piece 10. After the desired drilling has been completed, the apparatus 20 may then be lifted off of the work-piece 10 by an available crane or hoist or, in some situations, it may be appropriate merely to deactivate the clamping cylinders 104 and utilize the fluid motor drives 102 coupled with the wheels 88 for repositioning the apparatus 20 longitudinally of the work-piece 10 to the site of a next desired operation upon the work-piece 10. After completion of all of the desired drilling, the bolts 132 and clamps which have been utilized to retain the splicing plates 18 and 19 in place upon the side plates 15 and 16 of the work-piece 10 will be removed and the work-piece 10 disassembled for transportation to the job site. With the splicing plates 18 and 19 and the side plates 15 and 16 of the work-piece 10 thus accurately and simultaneously predrilled at the fabrication yard, the task of final assembly of the ultimate structure in which the work-piece 10 is to be utilized is greatly expedited and the delays customarily occasioned by misfits, the need for redrilling of certain holes, the refabrication of parts and the like being virtually eliminated.

It will be perceived, therefore, that the invention provides apparatus 20 ideally adapted for accompanying its objectives of increased accuracy and efficiency. Those skilled in the art will regonize, of course, that various changes and modifications could be made from the details of construction of the preferred embodiment described for illustrative purposes without departing from the essence of the invention. Accordingly, it is to be understood that the invention should be deemed limited only by the fair scope of the claims which follow, including mechanical equivalents thereof.

We claim:

1. Work-piece supported apparatus for performing machine tool operations upon a work-piece having a pair of spaced, upstanding, flange portions presenting a pair of substantially parallel, elongate, track surfaces, said apparatus including:
    elongate beam means disposable transversely to said track surfaces;
    carrier means shiftably mounted on said beam means for selective positioning along the length of the latter, said carrier means including a pair of carrier assemblies independently shiftable on said beam means for selective positioning along the length of the latter;
    machine tool means supported by said carrier means and having powered, movable parts for operatively engaging said work-piece to perform machine tool operations on the latter, said machine tool means including a pair of tool assemblies each supported by a corresponding carrier assembly; and
    wheel means, said wheel means including a pair of sets of wheels and means for mounting each of said sets of wheels upon a corresponding carrier assembly,
    said carrier assemblies being selectively shiftable to positions along said beam means for disposing each of said sets of wheels in supported engagement upon a corresponding one of said track surfaces, whereby said beam means, said carrier means and said tool means are shiftably supported by said wheel means upon said track surfaces of said work-piece for selective positioning thereof along the length of the latter,
    said means for mounting each of said sets of wheels upon the corresponding carrier assembly including powered extensible means for vertically shifting the positions of each of said sets of wheels relative to the corresponding carrier assembly, whereby the positions of said beam means, said carrier means and said tool means are vertically adjustable relative to said work-piece,
    each of said sets of wheels including a pair of wheels each provided with a separate and independently controllable extensible means for shifting its relative vertical positioning with respect to the associated carrier assembly, whereby said beam means, said carrier means and said tool means may be selectively tilted about an axis transverse to said track surfaces.

2. Apparatus as set forth in claim 1, wherein:
    there are provided means associated with each of said carrier assemblies for clamping the latter in selected positions upon said beam means.

3. Apparatus as set forth in claim 1, wherein:
    each of said carrier assemblies is provided with means engagable with said work-piece for holding said carrier assembly in a selected position along the length of the track surface engaged by the set of wheels associated with said carriage assembly.

4. Apparatus as set forth in claim 1, wherein:
    each of said tool assemblies comprises a powered, multiple bit, drilling device having a bit-supporting head which is controllably shiftable relative to the corresponding carrier means and toward and away from said work-piece.

5. Work-piece supported apparatus for performing machine tool operations upon a work-piece having a pair of spaced, upstanding, flange portions presenting a pair of substantially parallel, elongate, track surfaces, said apparatus including:
    elongate beam means disposable transversely to said track surfaces;
    carrier means shiftably mounted on said beam means for selective positioning along the length of the latter, said carrier means including a pair of carrier assemblies independently shiftable on said beam means for selective positioning along the length of the latter;
    machine tool means supported by said carrier means and having powered, movable parts for operatively engaging said work-piece to perform machine tool operations on the latter, said machine tool means including a pair of tool assemblies each supported by a corresponding carrier assembly;
    wheel means, said wheel means including a pair of sets of wheels and means for mounting each of said sets of wheels upon a corresponding carrier assembly,
    said carrier assemblies being selectively shiftable to positions along said beam means for disposing each of said sets of wheels in supported engagement upon a corresponding one of said track surfaces, whereby said beam means, said carrier means and said tool means are shiftably supported by said wheel means upon said track surfaces of said workpiece for selective positioning thereof along the length of the latter, said means for mounting each of said sets of wheels upon the corresponding carrier assembly including powered extensible means for vertically shifting the positions of each of said sets of wheels relative to the corresponding carrier assembly, whereby the positions of said beam means, said carrier means and said tool means are vertically adjustable relative to said work-piece, each of said sets of wheels including a pair of wheels each provided with a separate and independently controllable extensible means for shifting its relative vertical positioning with respect to the associated carrier assembly, whereby said beam means, said carrier means and said tool means may be selectively tilted about an axis transverse to said track surfaces;

means associated with each of said carrier assemblies for clamping the latter in selected positions upon said beam means; and means associated with each of said carrier assemblies and engagable with said work-piece for holding said carrier assembly in a selected position along the length of the track surface engaged by the set of wheels associated with said carrier assembly, each of said tool assemblies comprising a powered multiple bit drilling device having a bit supporting head which is controllably shiftable relative to the corresponding carrier assembly and toward and away from said work-piece.

6. Apparatus as set forth in claim 5, wherein:

each of said wheels is provided with an out-turned flange for engaging a corresponding side of said work-piece, and each engagable means associated with each carrier assembly includes an engaging element carried by a crank mechanism, actuatable by a fluid cylinder and disposed for engaging said work-piece opposite said out-turned flange of each of said wheels respectively for clamping said carriage assemblies to said work-piece adjacent each of said wheels.

7. Apparatus as set forth in claim 5, wherein:

said wheel mounting means associated with each carrier assembly incluides a pair of plates mounted upon said carriage assembly for independent vertical reciprocation, a fluid cylinder for each of said plates respectively and operably coupled with the latter for selectively shifting the same into various vertical positions relative to said carrier assembly, and means for rotatably mounting each of said wheels upon a corresponding one of said plates.

8. Apparatus as set forth in claim 5, wherein:

there is provided upon each of said carrier assemblies a fluid motor operably coupled with one of said set of wheels associated with said carrier assembly for shifting the position of said beam means, said carrier assemblies and said tool assemblies along the length of said track surfaces.

9. Apparatus as set forth in claim 5, wherein:

each of said carrier assemblies includes a tubular frame through which said beam means extends, there are provided cooperating guide means between said beam means and each of said carrier assemblies at the top and bottom thereof, and said guide means for each of said carrier assemblies includes a shiftable pad actuatable by a fluid cylinder for clamping said carrier assembly in a selected position upon said beam means.

* * * * *